(12) United States Patent
Matsuda et al.

(10) Patent No.: US 10,720,055 B2
(45) Date of Patent: Jul. 21, 2020

(54) PARKING ASSIST APPARATUS

(71) Applicant: Hitachi Automotive Systems, Ltd., Hitachinaka-shi, Ibaraki (JP)

(72) Inventors: Satoshi Matsuda, Hitachinaka (JP); Nobuhiro Akasaka, Hitachinaka (JP); Satoru Okubo, Hitachinaka (JP); Yusuke Kogure, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/327,095

(22) PCT Filed: Jul. 20, 2017

(86) PCT No.: PCT/JP2017/026239
§ 371 (c)(1),
(2) Date: Feb. 21, 2019

(87) PCT Pub. No.: WO2018/037780
PCT Pub. Date: Mar. 1, 2018

(65) Prior Publication Data
US 2019/0180621 A1    Jun. 13, 2019

(30) Foreign Application Priority Data
Aug. 24, 2016 (JP) .................. 2016-163716

(51) Int. Cl.
*G08G 1/14* (2006.01)
*B60R 21/00* (2006.01)
(Continued)

(52) U.S. Cl.
CPC ............. *G08G 1/143* (2013.01); *B60R 21/00* (2013.01); *B60W 30/06* (2013.01);
(Continued)

(58) Field of Classification Search
CPC .......... G08G 1/143; G08G 1/14; G08G 1/146; B60R 21/00; B60W 30/06; G06K 9/00812; G06K 9/00838
(Continued)

(56) References Cited

U.S. PATENT DOCUMENTS

| 2005/0096974 A1* | 5/2005 | Chagoly | G08G 1/14 |
| | | | 705/13 |
| 2005/0182671 A1 | 8/2005 | Miyauchi | |

(Continued)

FOREIGN PATENT DOCUMENTS

| JP | 2004-34946 A | 2/2004 |
| JP | 2005-228002 A | 8/2005 |

(Continued)

OTHER PUBLICATIONS

International Search Report (PCT/ISA/210) issued in PCT Application No. PCT/JP2017/026239 dated Nov. 21, 2017 with English translation (four (4) pages).

(Continued)

*Primary Examiner* — Kerri L McNally
(74) *Attorney, Agent, or Firm* — Crowell & Moring LLP

(57) ABSTRACT

The present invention provides a parking assist apparatus capable of improving convenience when a passenger of a vehicle gets on and off. According to the present invention, the parking assistance apparatus acquires information on parking candidate frames, and where an own vehicle can park, from a front camera, a right camera, a rear camera, and a left camera configured to acquire information on a surrounding environment of the own vehicle, and from surrounding environment information acquired by these cameras. The parking assistance apparatus detects surrounding environment information and of the parking candidate frames, and from the surrounding environment information (Continued)

and information on the parking candidate frames, and determines a target parking position where the own vehicle parks based on the information on the parking candidate frames, the surrounding environment information, and the preference information related to getting on and off of a passenger who rides on the own vehicle.

7 Claims, 14 Drawing Sheets

(51) Int. Cl.
*B60W 30/06* (2006.01)
*G06K 9/00* (2006.01)

(52) U.S. Cl.
CPC ..... *G06K 9/00812* (2013.01); *G06K 9/00838* (2013.01); *G08G 1/14* (2013.01); *G08G 1/146* (2013.01)

(58) Field of Classification Search
USPC ....................................................... 340/932.2
See application file for complete search history.

(56) References Cited

U.S. PATENT DOCUMENTS

| | | | |
|---|---|---|---|
| 2008/0266139 A1* | 10/2008 | Kim | B62D 15/027 340/932.2 |
| 2014/0266805 A1* | 9/2014 | Tippelhofer | G08G 1/143 340/932.2 |
| 2015/0123818 A1* | 5/2015 | Sellschopp | G01C 21/3484 340/932.2 |
| 2017/0092130 A1* | 3/2017 | Bostick | G08G 1/143 |

FOREIGN PATENT DOCUMENTS

| | | |
|---|---|---|
| JP | 2005-267601 A | 9/2005 |
| JP | 2007-219738 A | 8/2007 |
| JP | 2008-96362 A | 4/2008 |
| JP | 2009-276927 A | 11/2009 |
| JP | 2010-173464 A | 8/2010 |
| JP | 2013-117780 A | 6/2013 |
| JP | 2015-69429 A | 4/2015 |

OTHER PUBLICATIONS

Japanese-language Written Opinion (PCT/ISA/237) issued in PCT Application No. PCT/JP2017/026239 dated Nov. 21, 2017 (six (6) pages).

\* cited by examiner

| ITEM NO. | CONTENTS | WEIGHTING | WEIGHTING IN RAINY WEATHER | WEIGHTING WHEN DRIVER IS ABSENT |
|---|---|---|---|---|
| 1 | ILLUMINANCE | 3 | 5 | 0 |
| 2 | SIZE OF PARKING SPACE | 5 | 5 | 0 |
| 3 | ROAD SURFACE (PUDDLE) | −5 | 0 | 0 |
| 4 | ROAD SURFACE (LAWN) | 0 | 0 | 0 |
| 5 | ROAD SURFACE (ASPHALT) | 5 | 5 | 5 |
| 6 | ROAD SURFACE (GRAVEL) | 0 | 0 | 0 |
| 7 | ROAD SURFACE (MUD) | 0 | 0 | 0 |
| 8 | ROAD SURFACE (SNOW) | 0 | 0 | 0 |
| 9 | ROAD SURFACE (FALLEN LEAVES) | −3 | −5 | 0 |
| 10 | ROAD SURFACE (METAL PLATE) | −5 | −5 | 0 |
| 11 | ROAD SURFACE (WOOD) | 0 | −5 | −5 |
| 12 | PRESENCE OR ABSENCE OF ROOF | 5 | 5 | 5 |
| 13 | TRAFFIC VOLUME OF SURROUNDINGS | −1 | 0 | 0 |
| 14 | NUMBER OF PARKED VEHICLES OF SURROUNDINGS | 3 | 5 | 0 |
| 15 | EXCLUSIVE PARKING SPACE FOR DISABLED PEOPLE AND THE LIKE | OUT OF TARGET | OUT OF TARGET | OUT OF TARGET |
| ⋮ | | | | |

FIG. 4A

| ITEM NO. | CONTENTS | WEIGHTING | WEIGHTING IN RAINY WEATHER | WEIGHTING WHEN DRIVER IS ABSENT |
|---|---|---|---|---|
| 1 | ILLUMINANCE | 3 | 5 | 0 |
| 2 | SIZE OF PARKING SPACE | 5 | 5 | 0 |
| 3 | ROAD SURFACE (PUDDLE) | -5 | 0 | 0 |
| 4 | ROAD SURFACE (LAWN) | 0 | 0 | 0 |
| 5 | ROAD SURFACE (ASPHALT) | 5 | 5 | 5 |
| 6 | ROAD SURFACE (GRAVEL) |  |  | 0 |
| ⋮ |  |  |  |  |

15b

15b1

| 1 | 2 | 3 |
| 4 | 5 | 6 |
| 7 | 8 | 9 |
| + | 0 | - |

PARKING ASSIST APPARATUS

TECHNICAL FIELD

The present invention relates to an apparatus for assisting a parking operation of a vehicle.

BACKGROUND ART

As a parking position guidance system capable of guiding to a parking position that conforms to user's preference with high accuracy, and of guiding to a parking position even in a parking lot that user has not used, PTL 1 describes a parking lot side device that is provided with a parking lot information DB storing parking tastes when a large number of vehicles have parked in a parking lot and determines a parking instruction position based on the parking lot information DB and taste information of a vehicle user transmitted from an in-vehicle parking position guide device.

CITATION LIST

Patent Literature

PTL 1: JP 2013-117780 A

SUMMARY OF INVENTION

Technical Problem

There is widely known a parking assist apparatus that assists any or all of a steering wheel operation, an accelerator operation, and a brake operation of a driver in order to assist guidance of a vehicle to a target parking position when the driver parks the vehicle.

The parking assist apparatus first detects a place where an own vehicle can park by analyzing environment information around the own vehicle acquired by an onboard sonar or an onboard camera in a parking lot, and notifies that the parkable place has been detected in an onboard display device such as a navigation system. A passenger such as a driver selects, among the parkable places displayed on the onboard display device, a place to be parked as a target parking position by using an input means of the onboard display device and starts parking assistance, so that the passenger can receive parking assistance when parking the vehicle in the target parking position.

However, in a current parking assist apparatus including PTL 1, there is a problem that a time for the passenger to get on and off after completion of the parking is not considered. As an example, there is a problem in convenience when the passenger gets on and off, such as guiding to a parking position where there is a puddle.

The present invention has been made in view of the above problem, and an object of the present invention is to provide a parking assist apparatus capable of improving convenience when a passenger gets on and off of a vehicle.

Solution to Problem

In order to solve the above problem, for example, a configuration described in the claims is adopted. While the present invention includes a plurality of means for solving the above problems, one example thereof includes: an external information acquisition unit configured to acquire external information of an own vehicle; a parkable space information acquisition unit configured to acquire information on a parkable space where the own vehicle can park, from the external information acquired by the external information acquisition unit; a parking environment detection unit configured to detect environment information of the parkable space from the external information and the parkable space information; a preference information storage unit configured to store preference information related to getting on and off of a passenger who rides on the own vehicle; and a parking space determination unit configured to determine a parking space where the own vehicle is to be parked based on the parkable space information, the environment information, and the preference information.

Advantageous Effects of Invention

According to the present invention, it is possible to improve convenience when a passenger gets on and off. The problems, configurations, and effects other than those described above will be clarified by the description of the embodiment below.

BRIEF DESCRIPTION OF DRAWINGS

FIG. 4 is a view showing an outline of preference information for a parking position of a passenger.

FIG. 4A is a view showing a state of setting preference information for a parking position of a passenger.

DESCRIPTION OF EMBODIMENTS

Figure 1:
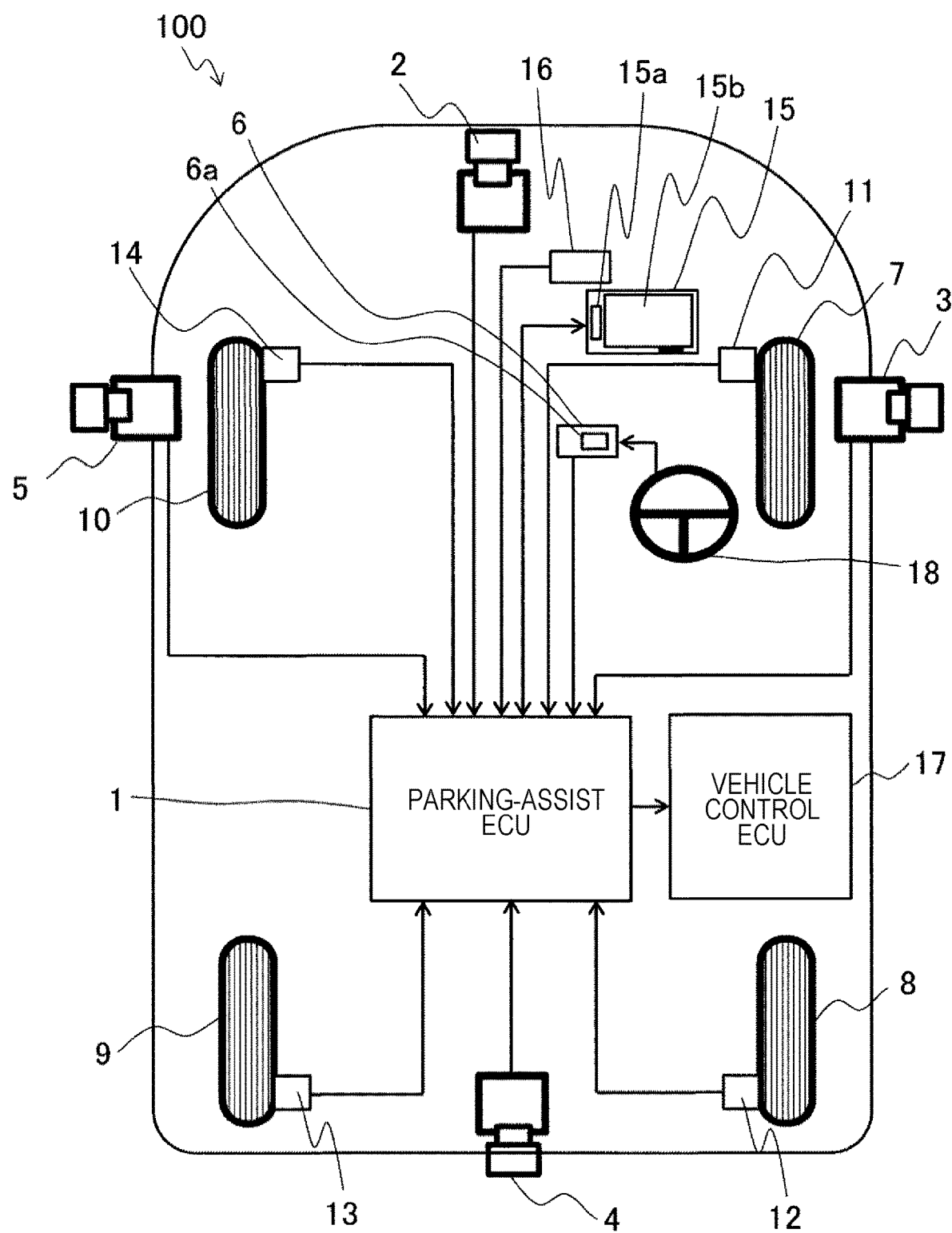
FIG. 1 is a view schematically showing a system configuration of an embodiment of a parking assist apparatus according to the present invention.

An embodiment of a parking assist apparatus according to the present invention will be described with reference to FIGS. 1 to 13. FIG. 1 is a view schematically showing an embodiment of a parking assist apparatus, which is the parking assist apparatus according to the present invention.

As shown in FIG. 1, the parking assist apparatus is mounted on an own vehicle 100, and composed of a parking-assist electronic control unit (ECU) 1, a front camera 2 mounted on a front side of the own vehicle 100, a right camera 3 mounted on a right side of the own vehicle 100, a rear camera 4 mounted on a rear side the own vehicle 100, a left camera 5 mounted on a left side of the own vehicle 100, an electric power steering device 6, a right front wheel speed sensor 11 configured to detect a wheel speed of a right front wheel 7, a right rear wheel speed sensor 12 configured to detect a wheel speed of a right rear wheel 8, a left rear wheel speed sensor 13 configured to detect a wheel speed of a left rear wheel 9, a left front wheel speed sensor 14 configured to detect a wheel speed of a left front wheel 10, an onboard display device 15, a human sensor 16, and a vehicle control ECU 17.

The front camera 2, the right camera 3, the rear camera 4, and the left camera 5 are provided with a lens and an image pickup element, and are appropriately arranged so as to be able to acquire information on a surrounding environment (external information) by imaging the surrounding environment of the own vehicle 100. Captured images captured by the cameras 2, 3, 4, and 5 are transmitted to the parking-assist ECU 1, and subjected to image processing.

The electric power steering device 6 includes a steering angle sensor 6a configured to detect a steering angle of a steering wheel 18, a motor (not shown) configured to support a steering torque serving as a torque to change a direction of each wheel, and an electric power steering ECU (not shown) configured to control the steering torque. The electric power steering device 6 controls the steering torque to support a driver's operation of the steering wheel, to change directions of the right front wheel 7, the right rear wheel 8, the left rear wheel 9, and the left front wheel 10. The steering angle detected by the steering angle sensor 6a is transmitted to the parking-assist ECU 1.

The right front wheel speed sensor 11, the right rear wheel speed sensor 12, the left rear wheel speed sensor 13, and the left front wheel speed sensor 14 respectively detect wheel speeds of the right front wheel 7, the right rear wheel 8, the left rear wheel 9, and the left front wheel 10, and transmit the respective wheel speeds to the parking-assist ECU 1. The parking-assist ECU 1 calculates a speed of the own vehicle 100 based on the information of each wheel speed described above.

The onboard display device 15 includes a preference information storage unit 15a and a screen 15b.

The preference information storage unit 15a is a storage device that stores preference information 15a1 (see FIG. 4) when a passenger who rides on the own vehicle 100 gets on and off.

The screen 15b displays images captured by the front camera 2, the right camera 3, the rear camera 4, and the left camera 5 and processed by the parking-assist ECU 1. For example, the screen 15b displays a location of a parking candidate of the own vehicle 100, surrounding environment information of the parking candidate, and a target parking position.

A pressure sensitive or an electrostatic touch panel is adopted as the screen 15b, enabling various input operations. In particular, by using the touch panel, the screen 15b can input the preference information 15a1 on parking of the passenger including the driver of the own vehicle 100 (preference information input unit, see FIG. 4A), and the inputted contents are stored in the preference information storage unit 15a and transmitted to the parking-assist ECU 1 as necessary.

The human sensor 16 is an infrared sensor for example, detects presence or absence of a passenger in the own vehicle 100 including a driver who drives the own vehicle 100, and transmits the detection result to the parking-assist ECU 1.

The parking-assist ECU 1 determines a target parking position (a parking space, a target parking frame 1101 (see FIG. 11)) in consideration of convenience of the passenger at getting on and off based on data received from each sensor and the preference information storage unit 15a, and transmits to the onboard display device 15 and the vehicle control ECU 17.

In order to assist a parking operation during parking at the target parking position, the vehicle control ECU 17 outputs a target steering angle to the electric power steering device 6, controls a traveling direction of the own vehicle 100, outputs a required driving force to a driving force control ECU (not shown) configured to control the driving force of the own vehicle 100, controls a speed of the own vehicle 100 by outputting a required braking force to a braking force control ECU (not shown) configured to control the braking force, and controls a shift range of the own vehicle 100 by issuing a request for a drive range or a reverse range or a parking range to a shift-by-wire control device configured to control the shift range of an automatic transmission. By controlling the own vehicle 100 with the vehicle control ECU 17, the driver can receive appropriate parking assistance during the operation for parking at the above target parking position.

Figure 2:
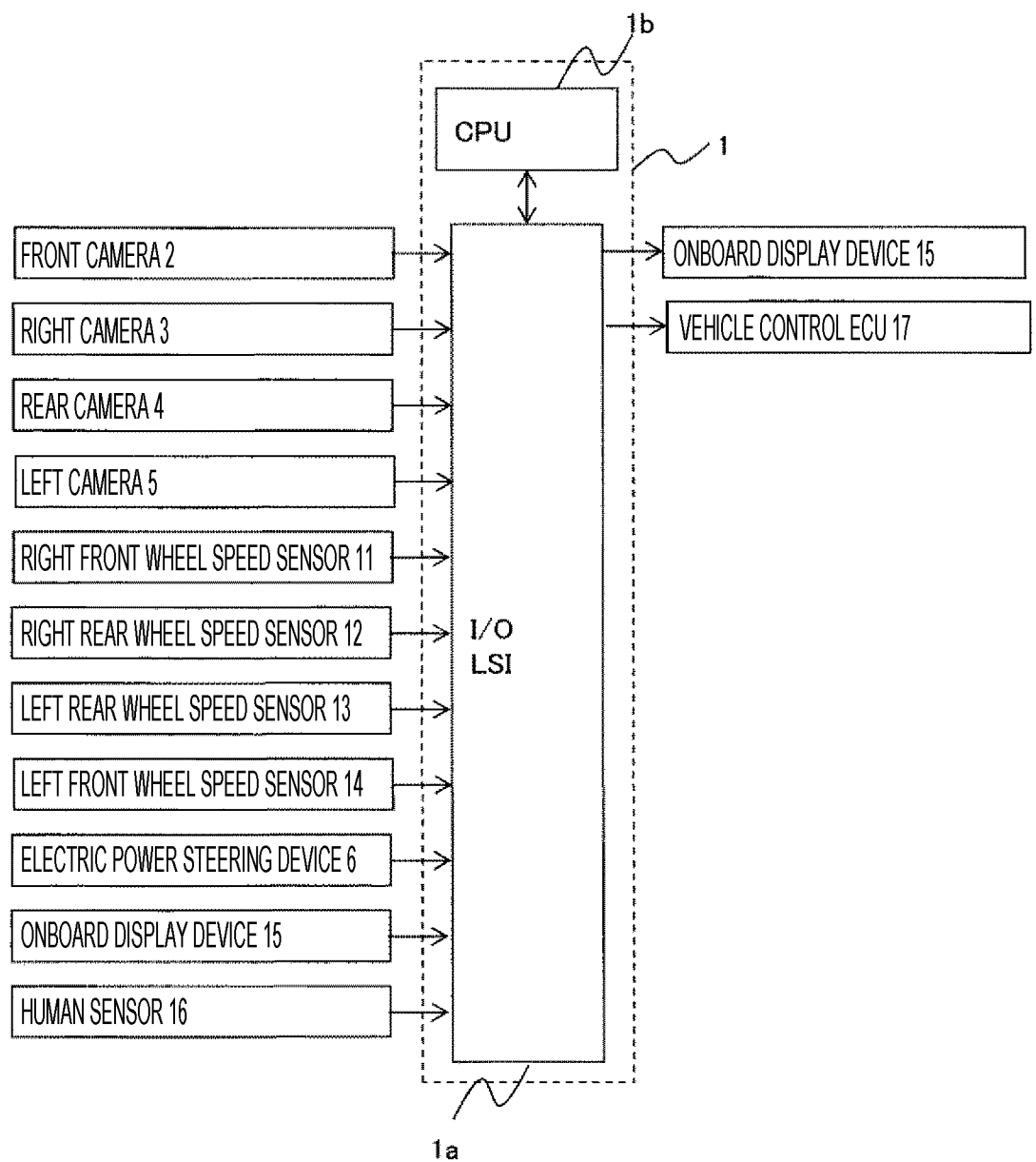
FIG. 2 is a block diagram showing a relationship between input and output signals of a parking-assist ECU shown in FIG. 1.

FIG. 2 schematically shows an example of an internal configuration of the parking-assist ECU 1 shown in FIG. 1, and is a block diagram showing a relationship between input and output signals of the parking-assist ECU 1 shown in FIG. 1.

The parking-assist ECU 1 is composed of an I/O LSI 1a including an A/D converter, a CPU 1b, and the like. As described above, to the parking-assist ECU 1, signals are inputted from the front camera 2, the right camera 3, the rear camera 4, the left camera 5, the electric power steering device 6, the right front wheel speed sensor 11, the right rear wheel speed sensor 12, the left rear wheel speed sensor 13, the left front wheel speed sensor 14, the onboard display device 15, and the human sensor 16.

The parking-assist ECU 1 outputs a parking candidate calculated by a predetermined calculation process, environment information around the parking candidate, and the target parking position to the onboard display device 15, and displays on the screen 15b of the onboard display device 15. Further, by outputting the target parking position to the vehicle control ECU 17 as described above, it is possible for the driver to receive appropriate parking assistance during the operation for parking the vehicle at the target parking position.

Figure 3:
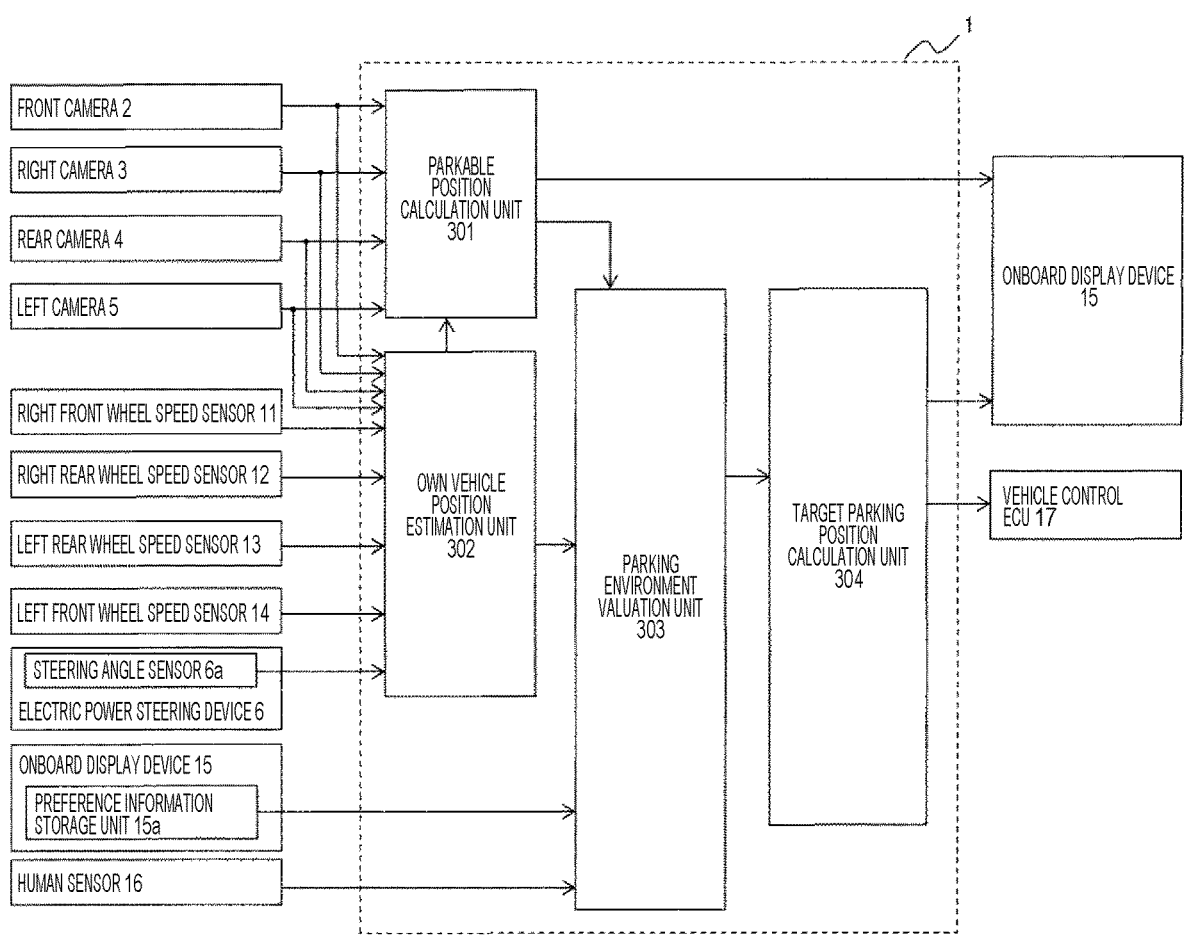
FIG. 3 is a block diagram showing an internal configuration of the parking-assist ECU shown in FIG. 1.

FIG. 3 shows a configuration related to an internal functional block configuration of the parking-assist ECU 1 shown in FIG. 1. Such a functional block is realized by hardware, software, or a combination thereof.

As shown in FIG. 3, the parking-assist ECU 1 has, as functions of the I/O LSI 1a and the CPU 1b shown in FIG. 2, a parkable position calculation unit 301, an own vehicle position estimation unit 302, a parking environment evaluation unit 303, and a target parking position calculation unit 304.

The own vehicle position estimation unit 302 calculates a speed of the own vehicle 100 from wheel speeds of the respective wheels 7, 8, 9, and 10 received from the right front wheel speed sensor 11, the right rear wheel speed sensor 12, the left rear wheel speed sensor 13, and the left front wheel speed sensor 14, and calculates a traveling direction of the own vehicle 100 from a steering angle of the steering wheel received from the steering angle sensor 6a of the electric power steering device 6. Further, the vehicle position estimation unit 302 calculates a coordinate position of the own vehicle 100 from environment information around the own vehicle 100 captured by the front camera 2, the right camera 3, the rear camera 4, and the left camera 5, and from information on the previously calculated vehicle speed and the traveling direction of the own vehicle 100, and transmits the coordinate position of the own vehicle 100 to the parkable position calculation unit 301 and the parking environment evaluation unit 303.

The parkable position calculation unit 301 analyzes environment information around the own vehicle 100 captured by the front camera 2, the right camera 3, the rear camera 4, and the left camera 5, and calculates whether or not there is a position where the own vehicle 100 can park, from the analyzed environment information and the coordinate position of the own vehicle 100 inputted from the own vehicle position estimation unit 302. The parkable position may not be found, or multiple parkable positions may be found. Therefore, as an example of analysis contents, when there is a parking space having a width, a length, and a height equal to or more than those of the own vehicle 100 around the own vehicle 100, the space is set as the parking candidate position, an analysis result of the coordinate position (parkable space information) of the parking candidate and the parking candidate surrounding environment (environment information of the parkable space) is transmitted to the parking environment evaluation unit 303 and the onboard display device 15.

The present embodiment exemplifies the environment information around the own vehicle 100 captured by the onboard cameras (each camera of the front camera 2, the right camera 3, the rear camera 4, and the left camera 5) as an example of input, but the environment information may be obtained by analyzing based on information of sensors using sound wave or light. Further, when there is a parking space having a width, a length, and a height equal to or more than those of the own vehicle 100, that space is set as the parking candidate, but the parking candidate may be detected by a parking frame, a parking lot information sign, or the like.

The own vehicle position estimation unit 302 and a part of the parkable position calculation unit 301 form a parkable space information acquisition unit configured to acquire parkable space information (parking candidate frames 901, 1001, and 1003) where the own vehicle 100 can park, from the surrounding environment information acquired by the front camera 2, the right camera 3, the rear camera 4, and the left camera 5, while a part of the parkable position calculation unit 301 forms a parking environment detection unit configured to detect the surrounding environment information 902 and 1002 (see FIGS. 9 and 10) of the parkable space from the external surrounding environment information and the parkable space information.

The parking environment evaluation unit 303 evaluates a parking candidate (the parking space, the target parking frame 1101 (see FIG. 11)) based on each piece of information of the coordinate position of the parking candidate calculated by the parkable position calculation unit 301 and surrounding environment information of the parking candidate, the coordinate position of the own vehicle 100 calculated by the own vehicle position estimation unit 302, the preference information 15a1 stored in the preference information storage unit 15a of the onboard display device 15, and information on presence or absence of a passenger of the own vehicle 100 detected by the human sensor 16. As an example of the evaluation method, there is a method of representing evaluation of each item of the preference information 15a1, which is composed of a plurality of evaluation items, by a score, and increasing the evaluation score of a candidate as the parking candidate conforms to the preference information 15a1 of the passenger for a parking place. Further, the parking environment evaluation unit 303 is adapted to change the score of the evaluation based on whether the passenger is on or off the own vehicle 100 specified by the human sensor 16. The above calculated evaluation result is transmitted to the target parking position calculation unit 304.

Based on the evaluation result of each parking candidate evaluated by the parking environment evaluation unit 303, the target parking position calculation unit 304 sets, among the parking candidates, a parking candidate having a highest evaluation as a target parking position, which is a parking place to be targeted, and transmits to the onboard display device 15 and the vehicle control ECU 17. If the evaluations are equal, it is possible to select the target parking position in consideration of conditions, such as the one closer to the own vehicle 100 and the one that is easy to park from the current traveling direction.

The parking environment evaluation unit 303 and the target parking position calculation unit 304 form a parking space determination unit configured to determine a parking space to be parked with the own vehicle 100 based on the coordinate position of the parking candidate, the parking candidate surrounding environment, and the preference information 15a1.

The onboard display device 15 visually notifies the driver of a location and surrounding environment information of the parking candidate, and a target parking position by superimposing the coordinate position of the parking candidate calculated by the parkable position calculation unit 301 with the surrounding environment information of the parking candidate, and the target parking position calculated by the target parking position calculation unit 304, on an image of surroundings of the own vehicle 100, and displaying on the screen 15b of the onboard display device 15.

As described above, the vehicle control ECU 17 allows the driver to receive appropriate parking assistance during the operation for parking at the above target parking position, by outputting a control signal necessary for supporting a movement of the own vehicle 100 toward the target parking position to the electric power steering device 6, the driving force control ECU, and the braking force control ECU of the own vehicle 100 in order to assist a parking operation during parking at the target parking position.

Next, a specific example of the preference information 15a1 to be used in the parking environment evaluation unit 303 will be described with reference to FIGS. 4 and 4A. FIG. 4 is an example of an outline of the preference information 15a1 of a passenger for a parking environment, stored in the preference information storage unit 15a of the onboard display device 15. FIG. 4A is a view showing a state of setting the preference information 15a1 of the passenger for a parking position.

First, the preference information 15a1 is information related to convenience when a passenger who rides on the own vehicle 100 gets on and off, in other words, it is information on matters and tendencies that the passenger gives priority when selecting a parking section, and it is information on passenger's specific and dependent conditions that are required when getting on and off. In addition, it is information on a request and wish when the passenger gets on and off the own vehicle 100, and information on matters and conditions to be avoided.

For example, in item No. 1 shown in FIG. 4, a preference detail for "illuminance (brightness) of the parking environment" when the passenger gets on and off is set. In a case where the passenger prefers a bright environment when getting on or off the vehicle, increasing weighting of item No. 1 causes evaluation of a parking candidate that is in a bright environment to become high when the parking environment evaluation unit 303 evaluates the parking candidate, and there is a high possibility that parking assistance to a bright place will be performed.

Further, regarding "road surface (puddle)" of item No. 3, in a case where the passenger dislikes that there is a puddle in the parking environment, setting a negative value as the weighting causes the evaluation to be lowered when the parking environment evaluation unit 303 evaluates the parking candidate, and the possibility of parking assistance to near a puddle is lowered.

As described above, the passenger weights for the preference of the parking environment, so that the preference of the passenger for the parking environment can be reflected more accurately on the target parking position.

Further, such as item No. 15, a parking candidate for which a target user is limited such as a parking space for disabled people and the like can be unselectable as the target parking position by setting the parking candidate to be out of the parking target.

Furthermore, the preference of the passenger for the parking environment may change depending on the weather. Therefore, as an example, when the weather is rainy, weighting of each item as shown in FIG. 4 is to be changed.

For example, there is a problem that a parking lot having a road surface made of wood is slippery. Therefore, in a case where the passenger dislikes it, the weighting of item No. 11 of "road surface (wood)" in rainy weather is set to −5. This lowers evaluation of a parking candidate having a road surface made of wood in the parking environment evaluation unit 303, and reduces the possibility for the parking candidate to be determined as the target parking position in rainy weather.

Meanwhile, regarding the preference information 15a1 when the passenger gets on and off, items are exemplified such as, as shown in FIG. 4, illuminance, a size of the parking space, a road surface condition of the parking space (puddle, lawn, asphalt, gravel, mud, snow, fallen leaves, metal plate, and wood), presence or absence of a roof above the parking space, a traffic volume around the parking space, a number of parked vehicles around the parking space, and whether the parking space is an exclusive parking space for disabled people and the like, but the above are not all, and the preference information 15a1 can be set as appropriate.

Further, as a parking assist function by the parking assist apparatus, there is known an automatic parking function in which all the passengers including the driver get off when the vehicle has arrived at the parking lot, the own vehicle 100 is automatically driven in a state where the passenger is absent, a parkable position is searched for, a target parking position is determined, and parking is performed.

During such automatic parking, necessity for taking into consideration of the preference detail when the passenger gets on and off is small. For this reason, it is possible to detect the presence or absence of the passenger by the human sensor 16, and to change the weighting for each item number depending on the presence or absence of the passenger as shown in FIG. 4. This change can be made by the passenger using the onboard display device 15, or the change can be automatically made.

As an example, regarding to item No. 1 "illuminance (brightness) of the parking environment" shown in FIG. 4 described above, possibility of concerning the "brightness of the parking environment at getting on and off" is low with the above-described automatic parking function as the passenger is absent. Therefore, the weighting when the passenger is absent is set to 0. This makes it possible not to affect determination of the target parking position. Further, in order to prevent the own vehicle 100 from becoming dirty due to a change in the weather, setting the weighting of the presence or absence of a roof at item No. 12 when the passenger is absent to 5 raises evaluation of a parking candidate having a roof in the parking environment evaluation unit 303, and increases possibility that the parking candidate is determined as the target parking position.

In such preference information 15a1, as shown in FIG. 4A, the passenger can input and appropriately change the weighting for the predetermined preference detail with use of an input column 15b1 by selecting an evaluation item to be changed on the pressure sensitive or the electrostatic screen 15b of the onboard display device 15 to highlight the item to be changed. The method for inputting and changing the weighting is not limited to this, as long as the evaluation item can be selected and the weighting can be changed.

Figure 5:
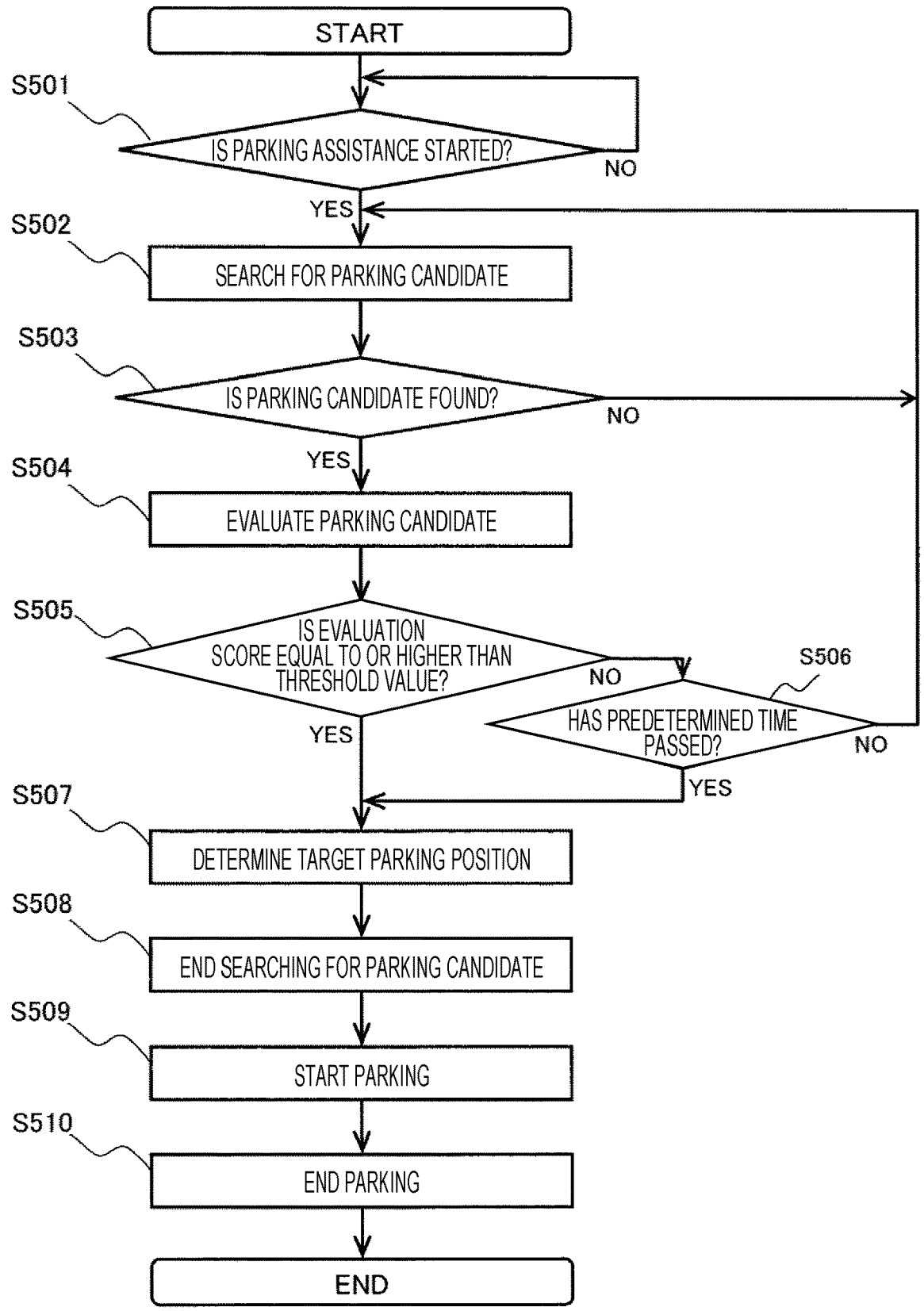
FIG. 5 is a flowchart explaining an arithmetic processing procedure by the parking-assist ECU 1 of the present invention.

Next, a procedure from a start of parking assistance by the parking assist apparatus to a completion of parking will be described with reference to FIG. 5. FIG. 5 is a flowchart describing a parking assist processing procedure by the parking assist apparatus shown in FIG. 1.

First, in step S501, the parking assist apparatus determines whether or not the passenger of the own vehicle 100 has requested a start of parking assistance. For example, in entering a parking lot to park the own vehicle 100, it is determined whether or not the passenger has performed a process of starting the parking assistance by using the touch panel mounted on the onboard display device 15. When it is determined that the request has been made, the process proceeds to step S502. On the other hand, when it is determined that the request has not been made, that is, when the passenger does not perform the process of starting parking assistance, the process is returned to before step S501, and the process of step S501 is performed again. In other words, the parking assist apparatus waits until the passenger starts parking assistance.

Although the determination to start the parking assistance in step S501 is made through an operation of the touch panel mounted on the onboard display device 15, the parking assistance may be automatically started by detecting that the own vehicle 100 has entered a parking lot by using a global positioning system (GPS) mounted on the own vehicle 100.

Next, in step S502, a sentence to prompt search of a parkable position is displayed on the screen 15b of the onboard display device 15. The driver confirming the above display manually drives the own vehicle 100. During the driving, the front camera 2, the right camera 3, the rear camera 4, and the left camera 5 of the own vehicle 100 capture environment information around the own vehicle 100. Further, the parkable position calculation unit 301 analyzes the captured environment information around the own vehicle 100, calculates the parkable position of the own vehicle 100, when a parkable position is found, sets the parkable position as a parking candidate, and stores the parking candidate and the surrounding environment information. After searching for a parking candidate for a certain time, the process proceeds to step S503.

In step S503, it is determined whether or not a parking candidate has been found in step S502. When it is determined that a parking candidate has been found, the parking candidate and the surrounding environment information are superimposed on an image of surroundings of the own vehicle 100 and displayed on the screen 15b of the onboard display device 15, and the process proceeds to step S504. By displaying on the screen 15b, it is possible to visually notify the driver of a location of the parking candidate and surrounding environment information thereof. As an example of the environment information, by displaying the presence or absence of a puddle, the driver can save effort for checking the condition of the parking candidate with his/her own eyes, and confirming the presence or absence of a puddle. On the other hand, if the parking candidate cannot be found, the process returns to step S502 and the search for the parking candidate is continued.

In step S504, one or more found parking candidates are evaluated. As an example of the evaluation method, as described in FIG. 4, based on the preference information 15a1 of the passenger for parking environment inputted by the passenger in advance, evaluation is performed as to whether or not the surrounding environment of the parking candidate is suitable for the preference information. At this time, as described above, the evaluation is performed in consideration of the weather and the presence or absence of the passenger of the own vehicle 100 by the human sensor 16. Thereafter, the process proceeds to step S505.

In step S505, it is determined whether or not an evaluation score of one or more parking candidates is equal to or higher than a threshold value. When it is determined that there is a parking candidate having a score equal to or higher than threshold value, in other words, when one or more parking candidates that are considered to sufficiently satisfy the passenger's preference are found, the parking candidate having a highest evaluation score is stored, and the process proceeds to step S507. When the evaluation values are equal, the candidate of the one that is easy to park is selected according to a state of the own vehicle 100. On the other hand, when it is determined that the evaluation score of the parking candidate is less than the threshold value, that is, if no parking candidate that is considered to sufficiently satisfy the passenger's preference is found, the parking candidate having a highest evaluation score is stored, and the process proceeds to step S506.

Next, step 506 will be described. In step S506, it is determined whether or not a predetermined time has passed since "a parking candidate having a highest evaluation score although it is not equal to or higher than the threshold value" stored in step S505 has been found and stored. When it is determined that the predetermined time has passed, the process proceeds to step S507. That is, if a parking candidate having an evaluation score equal to or higher than the threshold value cannot be found even when the parking assistance starts and a time for searching a parking candidate has passed for a predetermined time, it is avoided to keep driving the own vehicle 100 in the parking lot for searching for the parking candidate by proceeding to step 507. On the other hand, when it is determined that the predetermined time has not passed, the process returns to step S502 to continue searching for a parking candidate having an evaluation score equal to or higher than the threshold value.

In step S507, the parking candidate stored in step S505 is determined as the target parking position, and the process proceeds to step S508.

In step S508, on the screen 15b of the onboard display device 15, a sentence for notifying the end of the search for the parking candidate is displayed, and a sentence to prompt to stop the own vehicle 100 is displayed. Further, by superimposing the determined target parking position on an image of surroundings of the own vehicle 100 and displaying on the screen 15b of the onboard display device 15, the driver is clearly notified where to park visually.

In step S509, parking assistance toward the target parking position is started, and the vehicle control ECU 17 appropriately controls the own vehicle 100 in order to support a parking operation.

In step S510, when the own vehicle 100 completes the parking at the target parking position, the driving support is terminated, and a sentence notifying that the parking has been completed is displayed on the screen of the onboard display device 15.

By taking a procedure of the steps from step S501 to step S510, the target parking position can be automatically determined in consideration of the passenger's preference at getting on and off in the parking assistance of the own vehicle 100.

Next, a state from the start of parking assistance by the parking assist apparatus of the present embodiment to the completion of parking will be described below with reference to FIGS. 6 to 13. FIGS. 6 to 13 are views for explaining a state of parking assistance by the parking assist apparatus shown in FIG. 1.

FIGS. 6 to 13 show a state of a parking lot viewed from the above and contents displayed on the screen 15b of the onboard display device 15, and are arranged in a chronological order of FIG. 6 to FIG. 13. Further, a parking assist function is used in order to park the own vehicle 100 in an available parking space in the parking lot, and symbols P1 to P8 denoted by reference numerals 601 to 608 are symbols uniquely indicating respective parking spaces in consideration of the convenience of explanation. Other vehicles are parked in parking spaces P1, P2, P3, P5, and P6, there is a puddle 609 in P4, and P7 is an exclusive parking space for disabled people and the like. The screen 15b of the onboard display device 15 displays a surrounding image of the own vehicle 100 as if viewing the own vehicle 100 from directly above, which is created by combining images captured by the front camera 2, the right camera 3, the rear camera 4, and the left camera 5. Regarding the preference detail when the passenger gets on and off, the one shown in FIG. 4 is referred to as an example.

Figure 6:
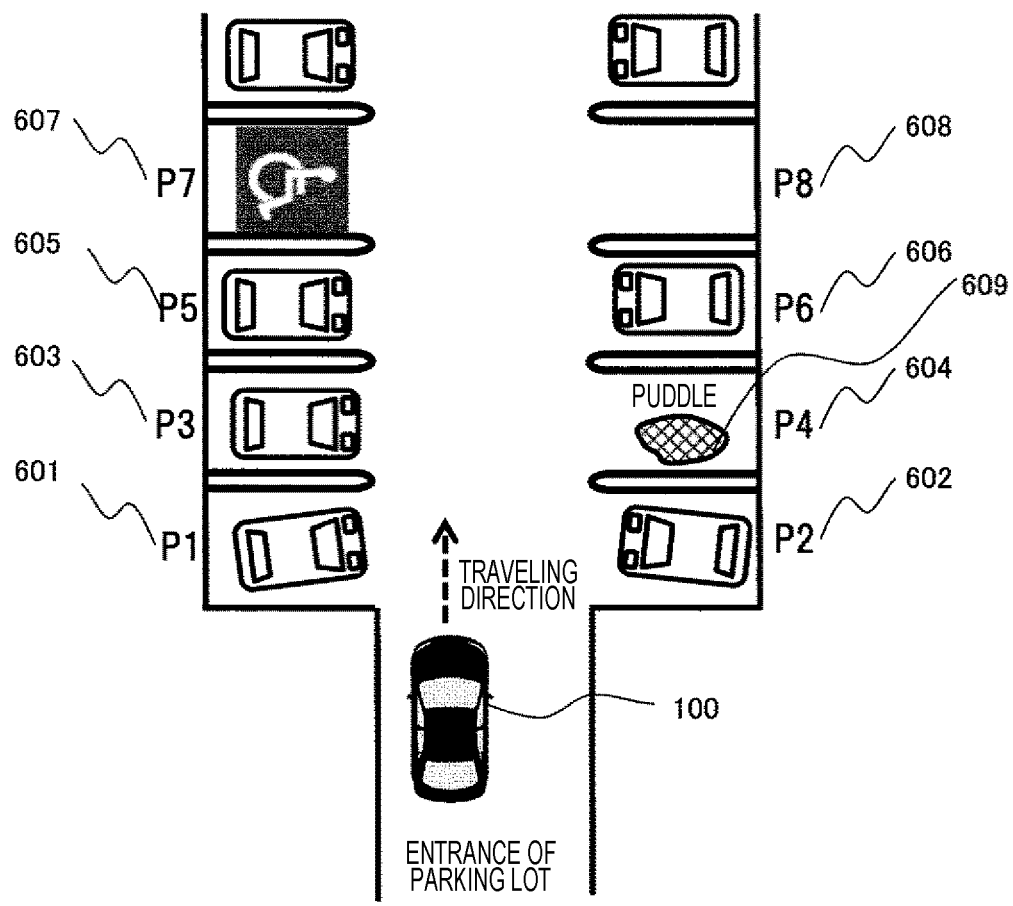
FIG. 6 is a view describing an embodiment of parking assistance by the parking assist apparatus of the present invention.
Figure 6:

First, as shown in FIG. 6, when entering a parking lot to park the own vehicle 100, the passenger such as a driver presses a parking assistance start button 611 displayed on the screen of the onboard display device 15. This causes parking assistance to be started. This FIG. 6 is a process corresponding to step S501 of the flowchart of FIG. 5.

Figure 7:
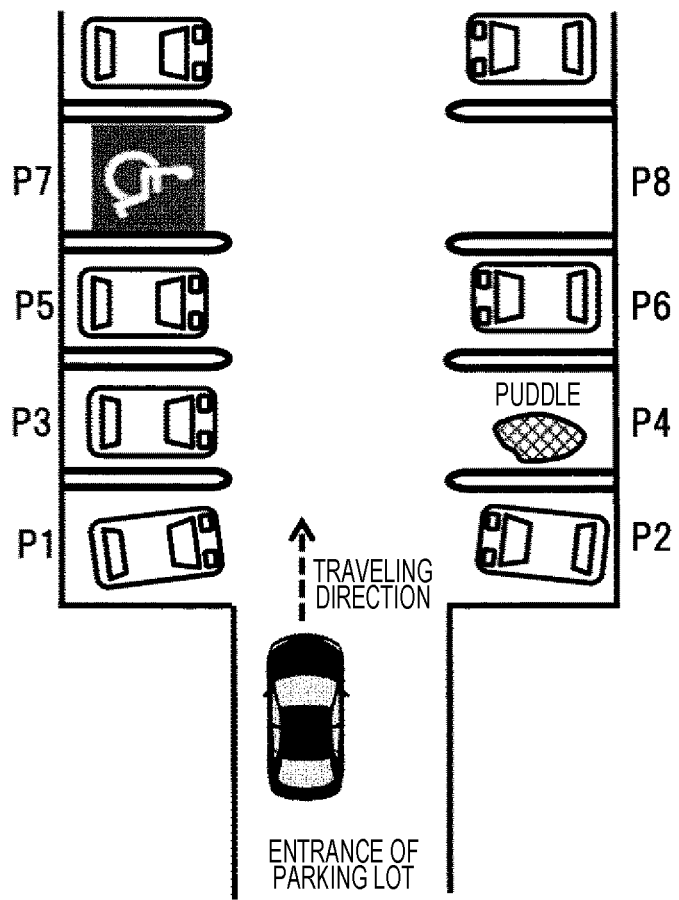
FIG. 7 is a view describing an embodiment of parking assistance by the parking assist apparatus of the present invention.
Figure 7:
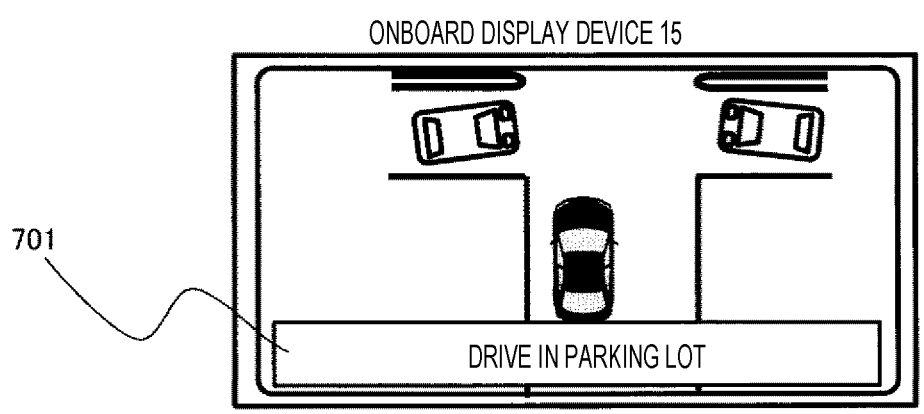

Next, as the passenger instructs a start of the parking assistance, a sentence prompting the passenger to search for a parking candidate by driving inside the parking lot, such as a sentence 701, is displayed on the screen of the onboard display device 15 as shown in FIG. 7.

Figure 8:
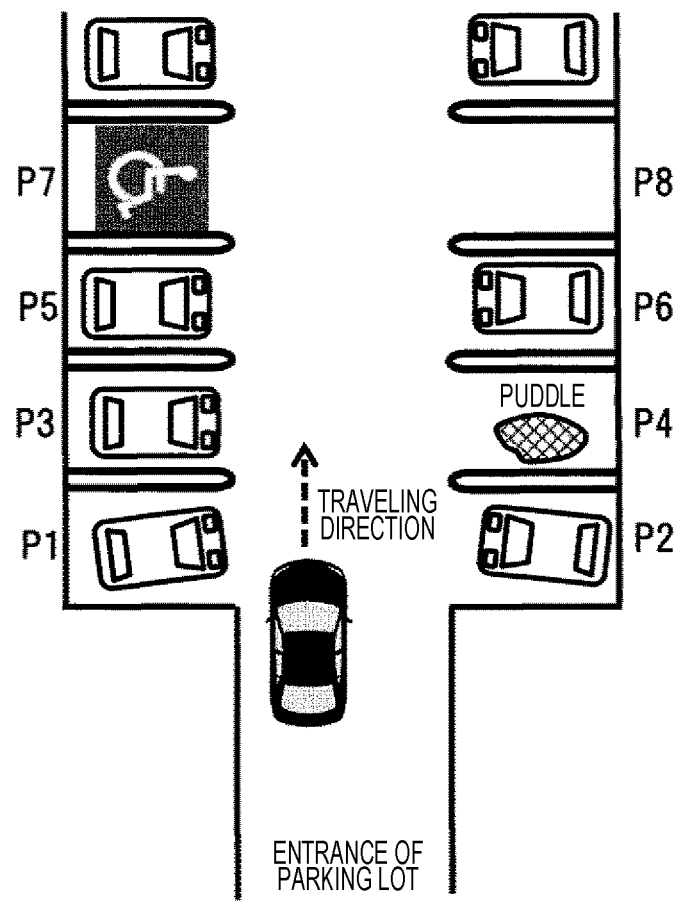
FIG. 8 is a view describing an embodiment of parking assistance by the parking assist apparatus of the present invention.
Figure 8:
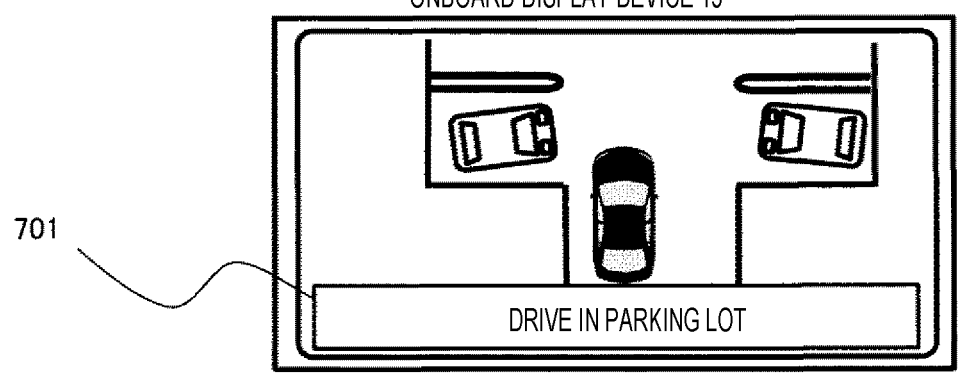

In a state where the parking candidate is not found, a sentence prompting the passenger to search for a parking candidate by driving inside the parking lot, such as the sentence 701, is continuously displayed on the screen of the onboard display device 15 as shown in FIG. 8.

Figure 9:
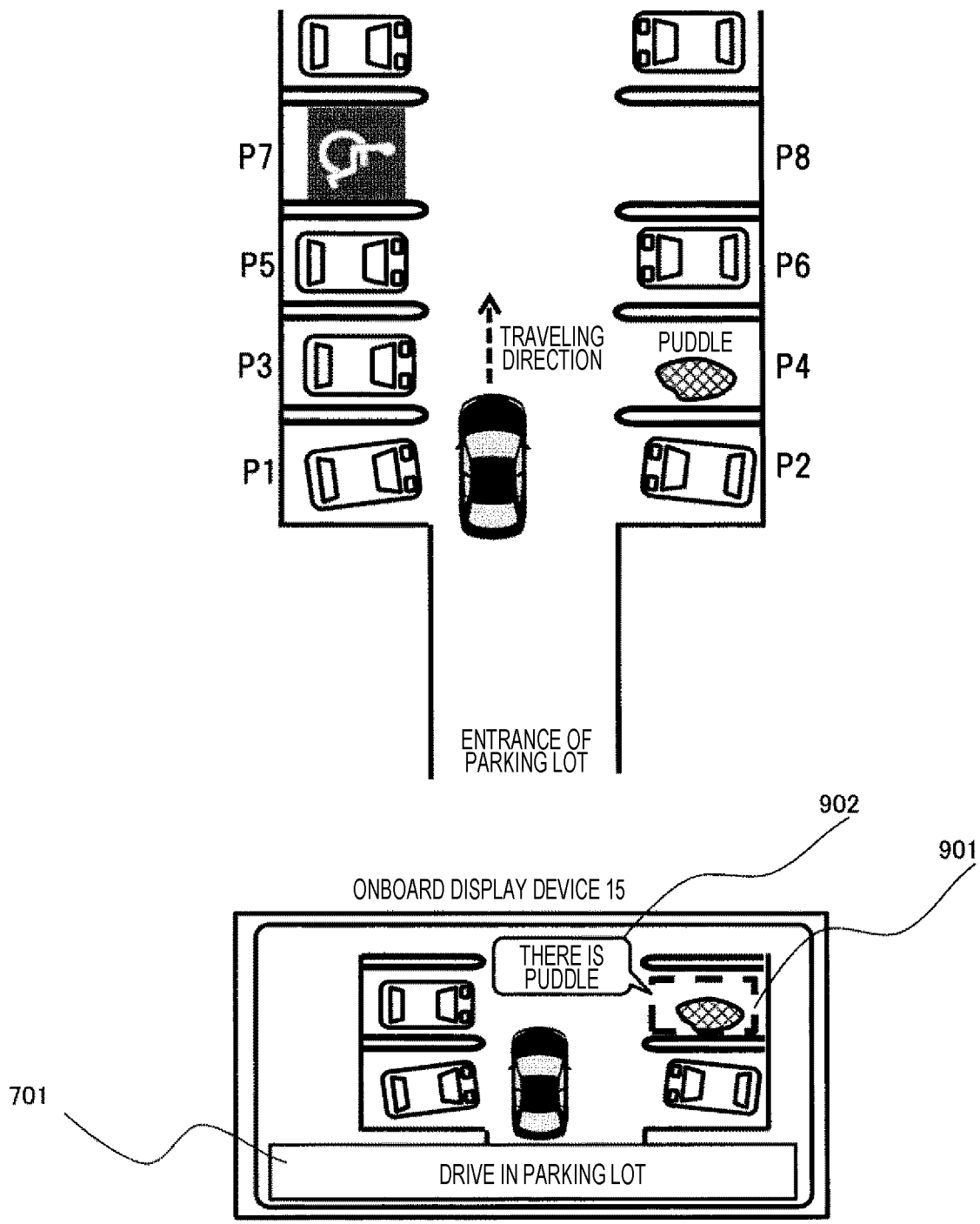
FIG. 9 is a view describing an embodiment of parking assistance by the parking assist apparatus of the present invention.

When the parking space P4 is found as a parking candidate, on the screen of the onboard display device 15 as shown in FIG. 9, the parking candidate frame 901 indicating that the parking space P4 has become a parking candidate and surrounding environment information 902 thereof are displayed. However, since an evaluation score of the parking candidate is less than the threshold value due to presence of a puddle in the parking space P4, and the parking candidate has not become the target parking position, the surrounding environment information 902 indicating "there is a puddle" is displayed. By displaying this surrounding environment information 902, the passenger can confirm that the parking candidate does not match the own preference without checking by himself/herself. In FIG. 9, since the target parking position has not yet been determined, the sentence 701 prompting the passenger to search for a parking candidate by driving inside the parking lot is continued, and the driver continues driving of the own vehicle 100. The detail described with reference to FIGS. 7, 8, and 9 is a process corresponding to steps S502 to S506 of the flowchart of FIG. 5.

Figure 10:
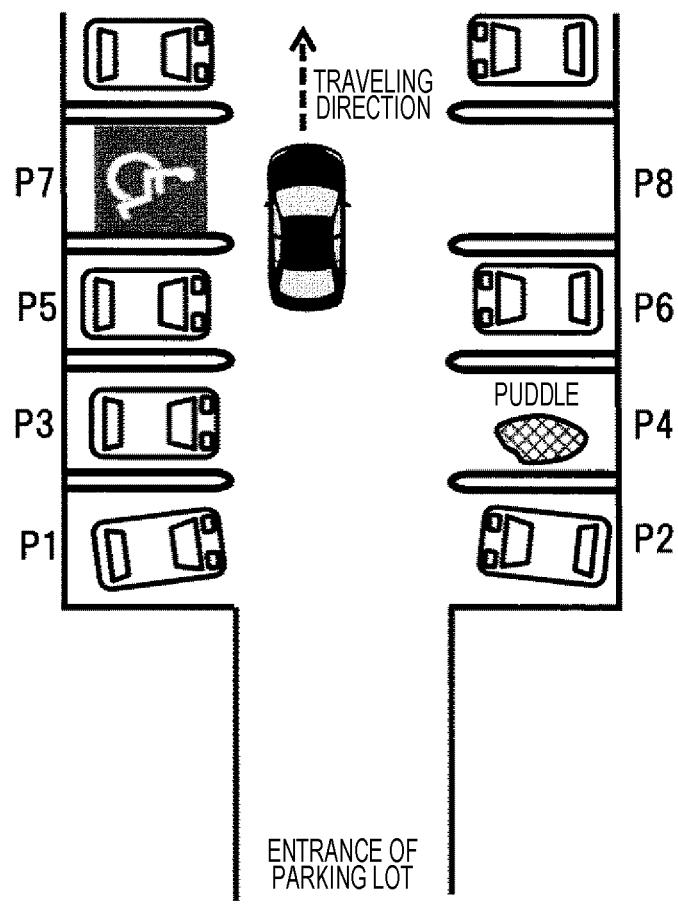
FIG. 10 is a view describing an embodiment of parking assistance by the parking assist apparatus of the present invention.
Figure 10:
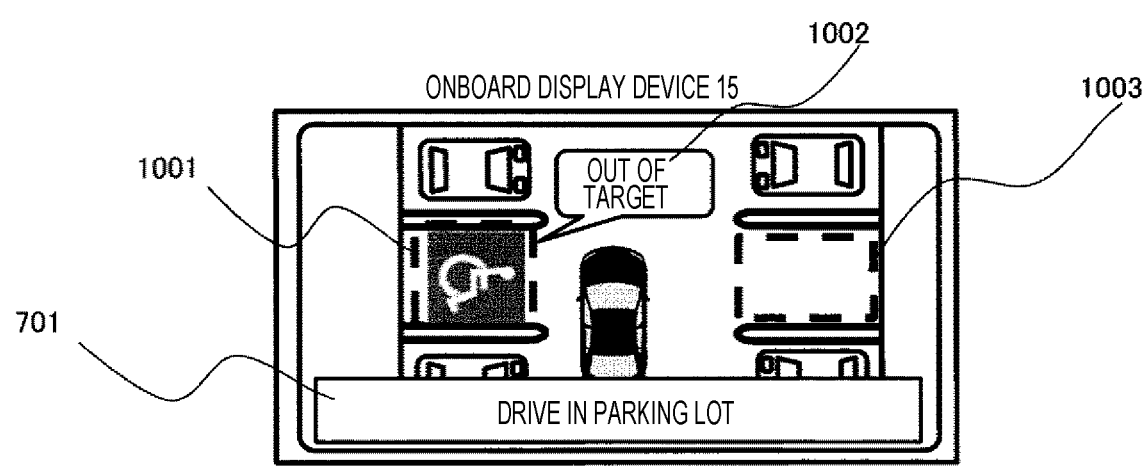

Further, when the parking spaces P7 and P8 are found by continuing searching for a parking candidate by driving inside the parking lot, on the screen of the onboard display device 15 as shown in FIG. 10, the parking candidate frame 1001 is superimposed and displayed on the parking space P7, and the parking candidate frame 1003 is superimposed and displayed in the parking space P8, where the parking candidate frames 1001 and 1003 indicate that the parking spaces P7 and P8 are found as parking candidates.

Among the found parking spaces, since the parking space P7 is an exclusive parking space for disabled people and the like, surrounding environment information 1002 of "out of target" indicating that the parking space P7 is not to be selected as the target parking position is displayed together with the parking candidate frame 1001 as shown in FIG. 10. Displaying such surrounding environment information 1002 allows the passenger to confirm that the parking space P7 is not to be selected as the target parking position.

Figure 11:
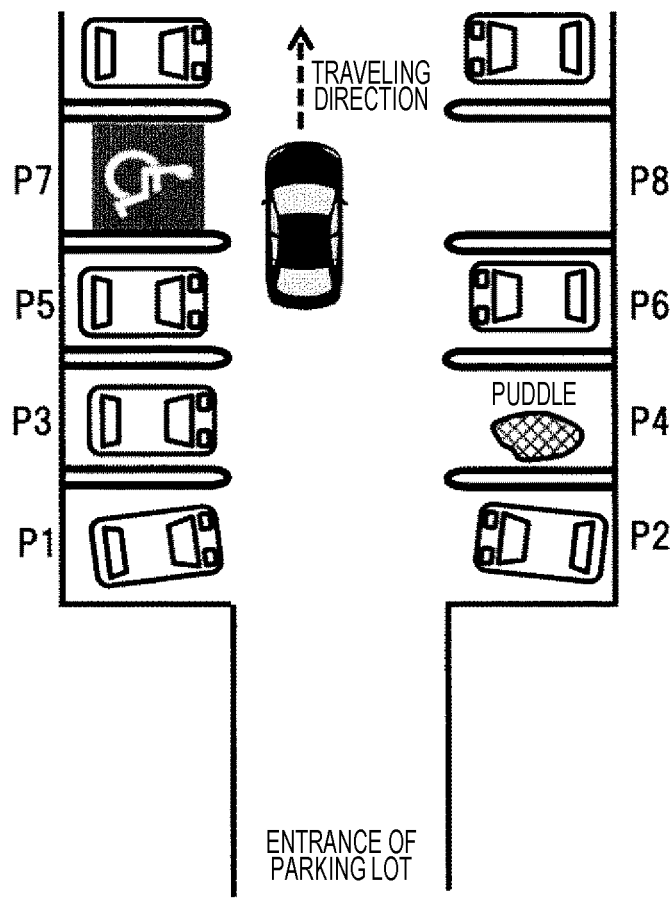
FIG. 11 is a view describing an embodiment of parking assistance by the parking assist apparatus of the present invention.
Figure 11:
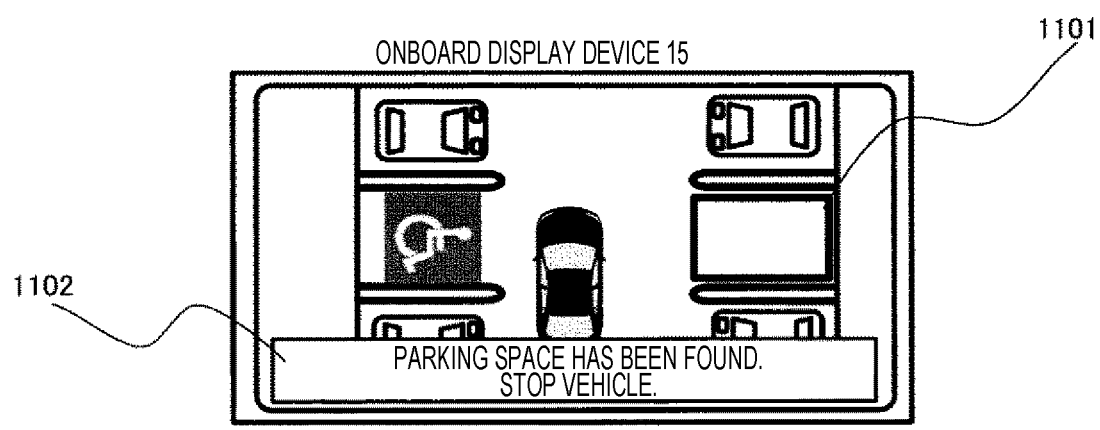

On the other hand, regarding the parking space P8, since the evaluation result of the surrounding environment of the parking candidate P8 has shown that the evaluation score is equal to or higher than the threshold value, the target parking frame 1101 is displayed on the screen 15b of the onboard display device 15 as shown in FIG. 11, instead of the parking candidate frame 1003, in order to indicate the parking candidate P8 as the target parking position to the passenger. Further, because the target parking frame has been determined, a sentence 1102 prompting the driver to stop the own vehicle 100 is displayed. The detail described with reference to FIGS. 10 and 11 is a process corresponding to steps 507 to S508 of the flowchart of FIG. 5.

Figure 12:
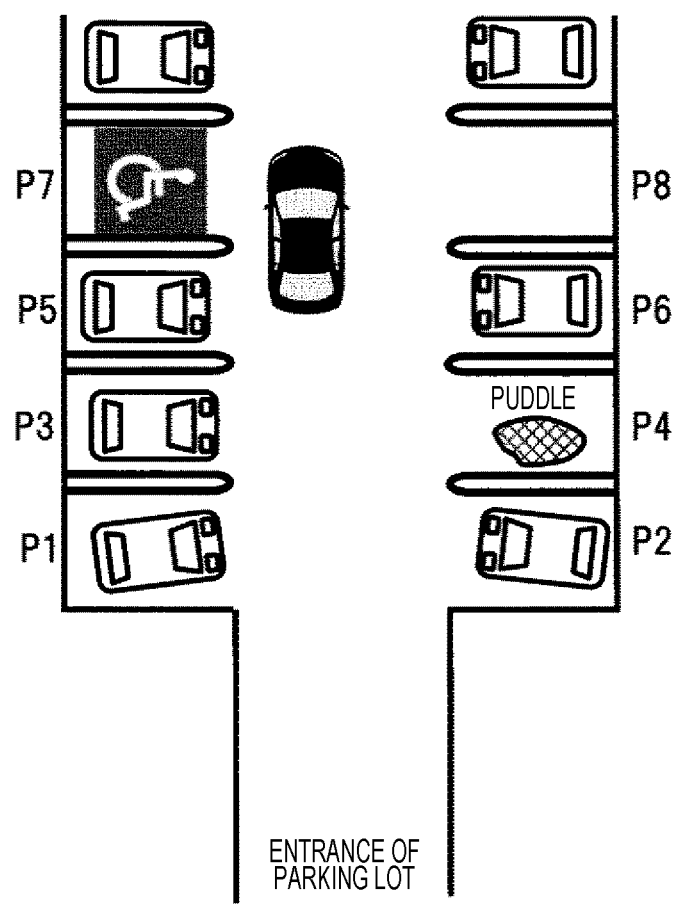
FIG. 12 is a view describing an embodiment of parking assistance by the parking assist apparatus of the present invention.
Figure 12:
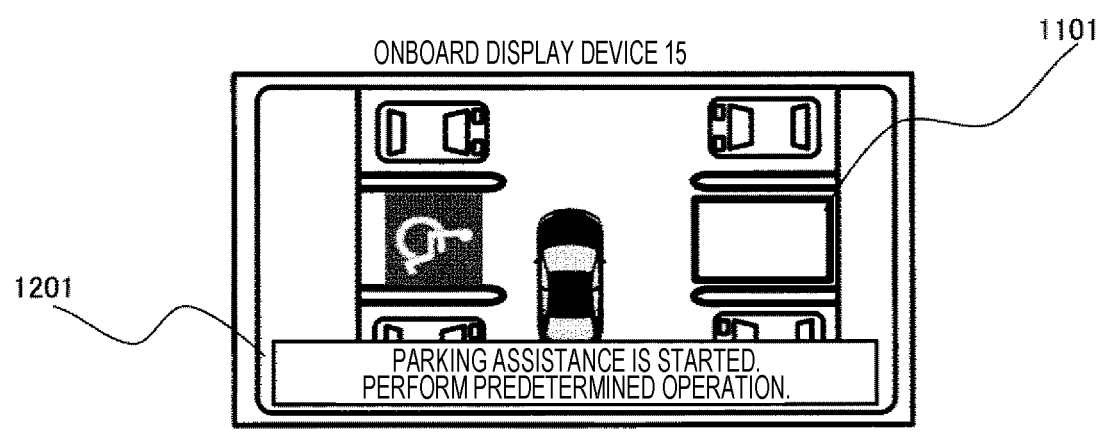

Thereafter, as shown in FIG. 12, the driver stops the own vehicle 100 and starts a parking operation. In order to park in the target parking frame 1101, the parking assist apparatus displays a sentence 1201 prompting the driver to perform a predetermined parking operation, and assists the parking operation with the vehicle control ECU 17 when the driver starts the parking operation. FIG. 12 is a process corresponding to step 509 of the flowchart of FIG. 5.

Figure 13:
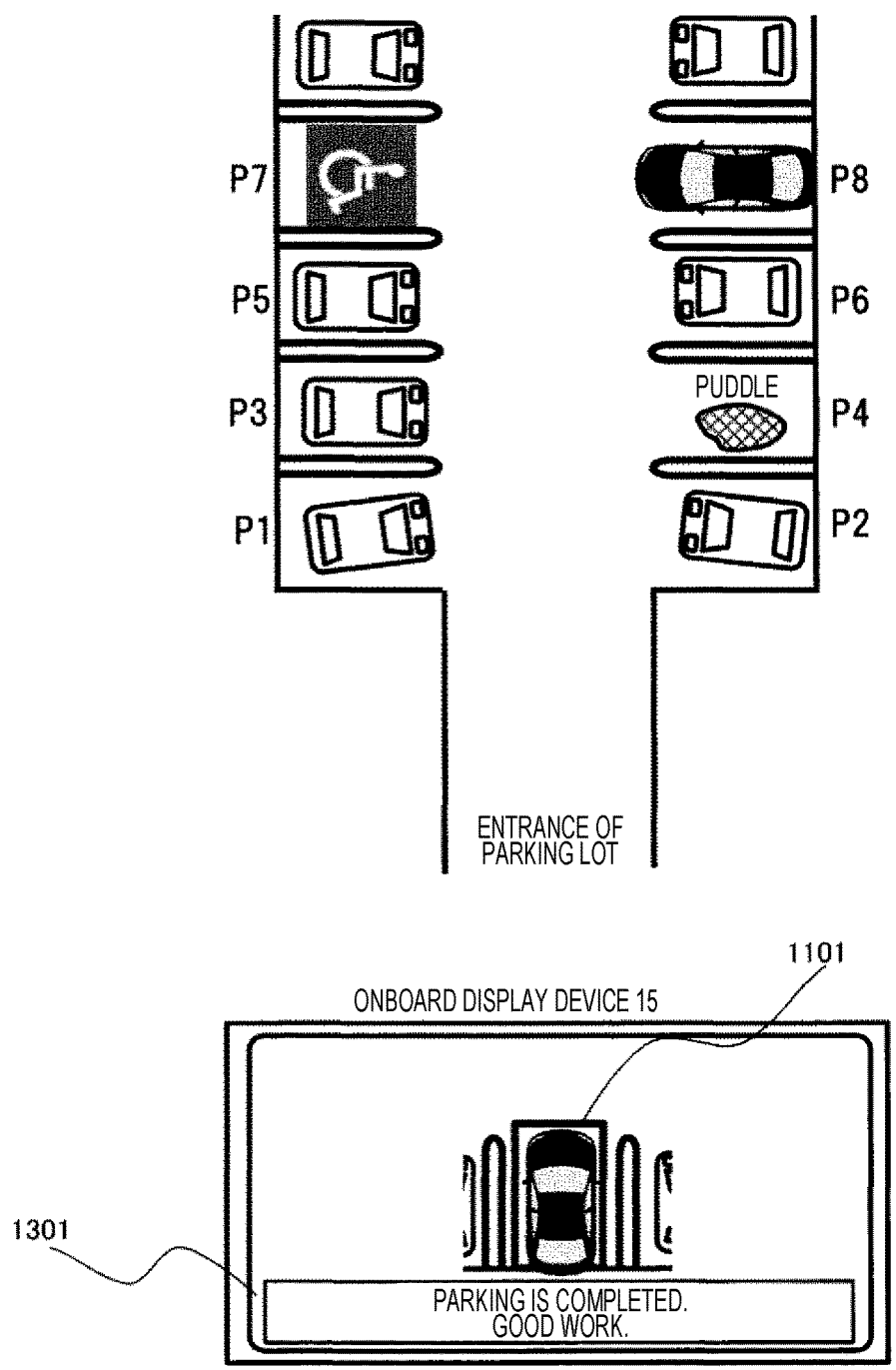
FIG. 13 is a view describing an embodiment of parking assistance by the parking assist apparatus of the present invention.

Thereafter, as shown in FIG. 13, parking of the own vehicle 100 in the target parking frame 1101 is completed by the parking assistance. Upon completion, the parking assist apparatus displays, on the screen of the onboard display device 15, a sentence 1301 notifying the passenger that the parking has been completed, and the parking assistance function is terminated. FIG. 13 is a process corresponding to step 510 of the flowchart of FIG. 5.

Next, effects of the present embodiment will be described.

The parking assistance apparatus of the present embodiment described above acquires information on the parking candidate frames 901, 1001, and 1003 where the own vehicle 100 can park, from the front camera 2, the right camera 3, the rear camera 4, and the left camera 5 configured to acquire information on the surrounding environment of the own vehicle 100, and from the surrounding environment information acquired by these cameras. Further, the parking assistance apparatus detects the surrounding environment information 902 and 1002 of the parking candidate frames 901, 1001, and 1003 from the surrounding environment information and information on the parking candidate frames 901, 1001, and 1003, and determines the target parking position where the own vehicle 100 parks based on the information on the parking candidate frames 901, 1001, and 1003, the surrounding environment information 902 and 1002, and the preference information 15a1 related to getting on and off of the passenger who rides on the own vehicle 100.

By determining the target parking position with use of the preference information 15a1 related to getting on and off of the passenger who rides on the own vehicle 100 in this way, the preference of the passenger at getting on and off is more accurately reflected in the search of the target parking position, enabling improvement of convenience at getting on and off of the own vehicle 100. Further, by acquiring and analyzing the surrounding environment information of the own vehicle 100 with each sensor mounted on the own vehicle 100, it is possible to acquire more detailed and real-time information than the information analyzed by a facility in the parking lot, enabling accurate search of the target parking position that is more suited to the preference detail of the passenger at getting on and off.

Further, since the preference information 15a1 is composed of a plurality of evaluation items, it is possible to search for the target parking position reflecting the preference of the passenger at getting on and off more finely, enabling further improvement of the convenience at a time of getting on and off.

Furthermore, since there is further provided the onboard display device 15 for the passenger of the own vehicle 100 to input the preference information 15a1, it is possible to easily set and change the preference information 15a1, enabling more accurate reflection of the preference at a time of getting on and off.

Further, since weighting of the evaluation items can be changed through the onboard display device 15, it is possible to suitably change the preference of the passenger at getting on and off, enabling parking assistance with improved convenience.

Furthermore, it is not always necessary to reflect the preference information 15a1 when the passenger is absent, and it is conceivable that the choice of the target parking position is to be expanded. Therefore, there is further provided the human sensor 16 configured to specify the presence or absence of the passenger of the own vehicle 100, and the parking environment evaluation unit 303 and the target parking position calculation unit 304 change the weighting of the plurality of evaluation items based on the presence or absence of the passenger specified by the human sensor 16, enabling a more flexible search of the target parking position to be performed.

Further, by further providing the screen 15b to display the parking candidate frames 901, 1001, and 1003 and the surrounding environment information 902 and 1002, the passenger of the own vehicle 100 can easily grasp the target parking position or a reason for being inappropriate as the target parking position during parking, enabling improvement the convenience at a time of parking as well.

Furthermore, regarding the convenience at a time of getting on and off in parking, there are a large number of items that are largely influenced by the weather. In this regard, by enabling the parking environment evaluation unit 303 and the target parking position calculation unit 304 to change the weighting of the plurality of evaluation items based on the weather, the parking assistance according to a state of the surroundings of the own vehicle 100 becomes possible and the convenience at a time of getting on and off can be further improved.

Further, by setting the evaluation item of the preference information 15a1 to be at least one or more of a illuminance, a size, a road surface condition, presence or absence of a roof above, a traffic volume in the surroundings, or a number of parked vehicles in the surroundings of the parking candidate frames 901, 1001, and 1003, it is possible to perform parking assistance in consideration of the surrounding environment at a time of getting on and off, enabling further improvement of the convenience.

Further, by setting the road surface conditions of the parking candidate frames 901, 1001, and 1003 such that the road surface is at least one or more of a puddle, a lawn, an asphalt, a gravel, a mud, a snow, a fallen leaf, a metal plate, or wood, it is possible to perform parking assistance reflecting the item related to the convenience of underfoot of the passenger at getting on and off, enabling further improvement of the convenience.

<Others>

Note that the present invention is not limited to the above embodiment, and various modifications may be included. For example, the embodiment described above has been illustrated in detail to facilitate description for easy understanding of the present invention, and is not necessarily limited to the embodiment that includes all the configurations.

For example, control lines and information lines indicate what is considered to be necessary for the description, and do not necessarily indicate all the control lines and the information lines on the product. In practice, it can be considered that almost all the structures are mutually connected.

REFERENCE SIGNS LIST 1 parking-assist ECU
2 front camera
3 right camera
4 rear camera
5 left Camera
6 electric power steering device
6a steering angle sensor
7 right front wheel
8 right rear wheel
9 left rear wheel
10 left front wheel
11 right front wheel speed sensor
12 right rear wheel speed sensor
13 left rear wheel speed sensor
14 left front wheel speed sensor
15 onboard display device
16 human sensor
15a preference information storage unit
15a1 preference information
15b screen
15b1 input column
17 vehicle control ECU
18 steering wheel
100 own vehicle
301 parkable position calculation unit
302 own vehicle position estimation unit
303 parking environment evaluation unit
304 target parking position calculation unit
601, 602, 603, 604, 605, 606, 607, 608 parking space
611 parking assistance start button
701, 1102, 1201, 1301 sentence
901, 1001, 1003 parking candidate frame
902, 1002 surrounding environment information
1101 target parking frame

The invention claimed is:

1. A parking assist apparatus comprising:
an external information acquisition unit configured to acquire external information of an own vehicle;
a parkable space information acquisition unit configured to acquire information on a parkable space where the own vehicle can park, from the external information acquired by the external information acquisition unit;
a parking environment detection unit configured to detect environment information of a parkable space from the external information and the parkable space information;
a preference information storage unit configured to store preference information related to getting on and off of a passenger who rides on the own vehicle; and
a parking space determination unit configured to determine a parking space where the own vehicle is to be parked based on the parkable space information, the environment information, and the preference information, wherein
the preference information is composed of a plurality of evaluation items, and
the parking space determination unit changes weighting of the plurality of evaluation items based on weather.

2. The parking assist apparatus according to claim 1, further comprising a preference information input unit for a passenger of the own vehicle to input the preference information.

3. The parking assist apparatus according to claim 2, wherein
weighting of the evaluation items can be changed through the preference information input unit.

4. The parking assist apparatus according to claim 3, further comprising a human sensor configured to specify presence or absence of a passenger of the own vehicle, wherein
the parking space determination unit changes weighting of the plurality of evaluation items based on presence or absence of a passenger specified by the human sensor.

5. The parking assist apparatus according to claim 1, further comprising an environment information display unit configured to display the parkable space and the environment information.

6. The parking assist apparatus according to claim 1, wherein
an evaluation item of the preference information is at least one or more of an illuminance of a parkable space, a size of a parkable space, a road surface condition of a parkable space, presence or absence of a roof above a parkable space, a traffic volume around a parkable space, or a number of parked vehicles around a parkable space.

7. The parking assist apparatus according to claim 6, wherein
a road surface condition of the parkable space is that a road surface is at least one or more of a puddle, a lawn, an asphalt, a gravel, a mud, a snow, a fallen leaf, a metal plate, or wood.

\* \* \* \* \*